(12) United States Patent
Majagi

(10) Patent No.: US 6,984,454 B2
(45) Date of Patent: Jan. 10, 2006

(54) WEAR-RESISTANT MEMBER HAVING A HARD COMPOSITE COMPRISING HARD CONSTITUENTS HELD IN AN INFILTRANT MATRIX

(75) Inventor: Shivanand I. Majagi, Rogers, AR (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/455,492

(22) Filed: Jun. 4, 2003

(65) Prior Publication Data

US 2004/0234821 A1 Nov. 25, 2004

Related U.S. Application Data

(63) Continuation-in-part of application No. 10/444,734, filed on May 23, 2003, now abandoned.

(51) Int. Cl.
*B32B 15/16* (2006.01)
*B32B 18/00* (2006.01)
*C04B 35/56* (2006.01)

(52) U.S. Cl. ............... 428/614; 428/673; 428/674; 428/539.5; 428/469; 428/472; 428/212; 501/87; 501/93; 501/96.3

(58) Field of Classification Search ............... 428/614, 428/673, 674, 539.5, 469, 472, 212; 501/87, 501/93, 96.3
See application file for complete search history.

(56) References Cited

U.S. PATENT DOCUMENTS

| | | | |
|---|---|---|---|
| 3,149,411 A | | 9/1964 | Smiley et al. |
| 3,175,260 A | | 3/1965 | Bridwell et al. |
| 4,146,080 A | | 3/1979 | Baum |
| 4,327,156 A | * | 4/1982 | Dillon et al. ............... 428/568 |
| 4,720,199 A | * | 1/1988 | Geczy et al. ............... 384/282 |
| 4,836,307 A | * | 6/1989 | Keshavan et al. ........... 175/374 |

(Continued)

OTHER PUBLICATIONS

The Brazing Book, Handy & Harman, 850 Third Avenue, New York, NY 10022 (Copyright 1983).

(Continued)

*Primary Examiner*—John J. Zimmerman
*Assistant Examiner*—Jason Savage
(74) *Attorney, Agent, or Firm*—Matthew W. Smith

(57) ABSTRACT

A tough wear-resistant hard member that includes a hard composite member and a support that has a surface area adjacent to the hard composite member wherein the hard composite member is affixed to the support over at least a portion of the adjacent surface area of the support. The hard composite member includes a plurality of discrete hard constituents distributed in the hard composite member wherein each one of the discrete hard constituents is of a size so as to have a surface area between about 0.001 square inches and about 16 square inches. The hard composite member further contains a matrix powder that includes particles wherein substantially all of the hard particles have a size smaller than the size of the hard constituents. The hard composite member further includes an infiltrant alloy having a melting point between about 500 degrees Centigrade and about 1400 degrees Centigrade wherein the infiltrant alloy is infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member. The support is made of a material that is bondable with the infiltrant alloy whereby the infiltrant alloy forms a joint at the joinder of the support and the hard composite member.

31 Claims, 4 Drawing Sheets

U.S. PATENT DOCUMENTS

| | | | |
|---|---|---|---|
| 4,933,240 A | * | 6/1990 | Barber, Jr. .................. 428/608 |
| 5,589,268 A | | 12/1996 | Kelley et al. |
| 5,663,512 A | * | 9/1997 | Schader et al. ............... 75/239 |
| 5,733,649 A | | 3/1998 | Kelley et al. |
| 5,733,664 A | | 3/1998 | Kelley et al. |
| 5,791,422 A | * | 8/1998 | Liang et al. ................. 175/374 |
| RE37,127 E | * | 4/2001 | Schader et al. ............... 75/239 |
| 6,227,188 B1 | * | 5/2001 | Tankala et al. ........... 125/13.01 |
| 6,582,126 B2 | * | 6/2003 | North .......................... 384/276 |
| 6,659,206 B2 | * | 12/2003 | Liang et al. ................. 175/374 |

OTHER PUBLICATIONS

TRICON for Superior Brazing Materials, Tricon Brazing Alloys, Inc., 2325 Wisconsin Avenue, Downers Grove, IL 60515, no date on publication.

* cited by examiner

WEAR-RESISTANT MEMBER HAVING A HARD COMPOSITE COMPRISING HARD CONSTITUENTS HELD IN AN INFILTRANT MATRIX

CROSS-REFERENCE TO EARLIER PATENT APPLICATION

This patent application is a continuation-in-part to an earlier patent application by Shivanand Magaji assigned Ser. No. 10/444,734, now Abandoned, and entitled "A WEAR-RESISTANT MEMBER HAVING A HARD COMPOSITE COMPRISING HARD CONSTITUENTS HELD IN AN INFILTRANT MATRIX" and filed on May 23, 2003.

BACKGROUND OF THE INVENTION

The invention pertains to a wear-resistant member. In particular, the invention concerns a wear member that includes a hard composite member that is securely affixed to at least a portion of a support member. The hard composite comprises a plurality of hard components within a mold wherein an infiltrant alloy that has been infiltrated into the mass of the hard components.

In the past, the temperature at which the infiltrant alloy has been infiltrated into the mass of hard components has been high enough so that the infiltrant alloy had the potential to degrade the hard components upon contact therewith. Thus, there has been a desire to use an infiltrant alloy that has a melting point sufficiently low so as to minimize degradation of the hard components upon contact therewith.

There has also always remained the desire to render the manufacturing process for hard composite members less difficult. It would thus be desirable to use an infiltrant alloy that would ease the manufacturing process for the hard composite.

One example of a hard composite wherein degradation of the hard component was a concern was shown in U.S. Pat. No. 3,149,411 to Smiley et al. In the Smiley et al. patent there was an attempt to minimize the degradation of the cemented carbides by using an alloy that had a melting point between about 1750 degrees Fahrenheit (about 954 degrees Centigrade) and about 3000 degrees Fahrenheit (about 1649 degrees Centigrade). According to the Smiley et al. patent, the alloy also had to contain a metal from Group VIII, Series 4 of the Periodic Table (i.e., iron, cobalt or nickel) and minor amounts of chromium and boron. In the examples (see Cols. 7–8) of the Smiley et al. patent, the typical infiltration temperature ranged between about 2250 degrees Fahrenheit (1232 degrees Centigrade) and about 2600 degrees Fahrenheit (1427 degrees Centigrade).

Another example of a hard composite that had a matrix infiltrated between the interstices of a mass of the hard particles was shown in U.S. Pat. No. 3,175,260 to Bridwell et al. In the Bridwell et al. patent, particles of cemented tungsten carbide or tungsten carbide alloy were heated and the molten matrix metal poured into the mold containing the hard particles. The Bridwell et al. patent mentioned that the melting point of the matrix metal ranged between about 1550 degrees Fahrenheit (843 degrees Centigrade) and 2400 degrees Fahrenheit (1316 degrees Centigrade). The infiltration temperature ranged between about 1750 degrees Fahrenheit (945 degrees Centigrade) and about 2500 degrees Fahrenheit (1371 degrees Centigrade).

U.S. Pat. No. 5,589,268 to Kelley et al. (U.S. Pat. No. 5,733,649 to Kelley et al. was a divisional thereof) pertained to a composite that comprised at least one discrete hard element held by a matrix powder wherein an infiltrant alloy had been infiltrated into the hard components. One suggested infiltrant alloy was a copper-nickel-zinc alloy identified as MACROFIL 65 wherein literature from Belmont Metals, Inc. showed that the melting point was 1100 degrees Centigrade. Another suggested infiltrant alloy was a copper-manganese-nickel-zinc-boron-silicon alloy identified as MACROFIL 53. According to the Kelley et al. patent, the MACROFIL 53 was usually infiltrated at about 2200 degrees Fahrenheit (1204 degrees Centigrade). U.S. Pat. 5,733,664 to Kelley et al. was a continuation-in-part to the '268 Kelley et al. patent. The '664 Kelley et al. patent also disclosed the MACROFIL 53 alloy and the MACROFIL 65 alloy.

Since it is desirable to avoid the degradation of the hard components of a hard composite due to contact with the infiltrant alloy, it would be advantageous to provide a hard composite that utilizes a matrix material that does not degrade (or minimizes the degradation) of the hard components upon contact therewith during the infiltration process.

It is typical that for some applications, the hard composite attaches to a support member to form a wear member. The purpose of the hard composite is to provide wear resistance to the combination of the hard composite and the support member. The support member is intended to provide toughness to the wear member. In these cases, it would be advantageous for the infiltrant alloy and the support member to exhibit compatible properties so as to form a good bond between the hard composite and the support. In this application, it would also be advantageous to maintain the wear resistance properties, as well as the toughness properties, of the hard composite.

SUMMARY OF THE INVENTION

In one form thereof the invention is a tough wear-resistant hard member that includes a hard composite member and a support that has a surface area adjacent to the hard composite member wherein the hard composite member is affixed to the support over at least a portion of the adjacent surface area of the support. The hard composite member includes a plurality of discrete hard constituents distributed in the hard composite member wherein each one of the discrete hard constituents is of a size so as to have a surface area between about 0.001 square inches and about 16 square inches. The hard composite member further contains a matrix powder that includes particles wherein substantially all of the hard particles have a size smaller than the size of the hard constituents. The hard composite member further includes an infiltrant alloy having a melting point between about 500 degrees Centigrade and about 1400 degrees Centigrade wherein the infiltrant alloy is infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member. The support is made of a material that is bondable with the infiltrant alloy whereby the infiltrant alloy forms a joint at the joinder of the support and the hard composite member.

In another form thereof the invention is A tough wear-resistant hard member that comprises a support having a surface area and a hard composite member that is affixed to the support over at least a portion of the surface area of the support. The hard composite member comprises a plurality of discrete hard constituents distributed in the hard composite member wherein each one of the discrete hard constituents is of a size so as to have a surface area between about 0.001 square inches and about 16 square inches. The discrete hard constituents comprise one or more of: sintered cemented tungsten carbide wherein a binder includes one or more of cobalt, nickel, iron and molybdenum, coated sintered cemented tungsten carbide wherein a binder includes one or more of cobalt, nickel, iron and molybdenum, and the coating comprises one or more of nickel, cobalt, iron and molybdenum, one or more of the carbides, nitrides, and borides of one or more of titanium, niobium, tantalum, hafnium, and zirconium, tungsten carbide, one or more of the coated carbides, coated nitrides, and coated borides of one or more of titanium, niobium, tantalum, hafnium, and zirconium wherein the coating comprises one or more of nickel, cobalt, iron and molybdenum; coated tungsten carbide wherein the coating comprises one or more of nickel, cobalt, iron and molybdenum, coated silicon carbide wherein the coating comprises one or more of nickel, cobalt, iron and molybdenum, and coated silicon nitride wherein the coating comprises one or more of nickel, cobalt, iron and molybdenum; coated boron carbide. The hard composite member further comprises a matrix powder comprising hard particles wherein substantially all of the hard particles of the matrix powder have a smaller size than the hard constituents. The hard composite member further comprises an infiltrant alloy having a melting point between about 500 degrees Centigrade and about 1400 degrees Centigrade wherein the infiltrant alloy is infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member. The support is made of a material that is bondable with the infiltrant alloy whereby the infiltrant alloy forms a joint at the joinder of the support and the hard composite member.

In yet another form thereof, the invention is a tough wear-resistant hard member that comprises a hard composite member and a support having a surface area adjacent to the hard composite member. The hard composite member is affixed to the support over at least a portion of the adjacent surface area of the support. The hard composite member comprises a plurality of discrete hard constituents distributed in the hard composite member, each one of the discrete hard constituents is of a size so as to have a surface area between about 0.001 square inches and about 16 square inches. The hard composite member further comprises a matrix powder comprising hard particles wherein substantially all of the hard particles have a size smaller than the size of the hard constituents. The hard composite member further comprises an infiltrant alloy having a melting point between about 500 degrees Centigrade and about 1400 degrees Centigrade wherein the infiltrant alloy is infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member. The support is made of a material that is bondable with the infiltrant alloy whereby the infiltrant alloy forms a joint at the interface of the support and the hard composite member.

In yet another form thereof, the invention is a tough wear-resistant hard member that comprises a hard composite member and a support having a surface area adjacent to the hard composite member. The hard composite member is affixed to the support over at least a portion of the adjacent surface area of the support. The hard composite member comprises crushed nickel cemented chromium carbide particles having a particle size ranging between about −325 mesh and about +80 mesh, and the nickel content of the crushed nickel cemented chromium carbide particles ranges between about 3 weight percent and about 25 weight percent. The hard composite member further comprises an infiltrant alloy having a melting point between about 500 degrees Centigrade and about 1400 degrees Centigrade wherein the infiltrant alloy is infiltrated under heat into a mixture of the discrete hard constituents and the matrix powder so as to not effectively degrade the hard constituents upon infiltration, whereby the hard constituents and the matrix powder and the infiltrant-alloy are bonded together to form the hard composite member. The infiltrant alloy comprises between about 60 weight percent and about 80 weight percent of the hard composite, and the nickel cemented chromium carbide particles comprise between about 20 weight percent and about 40 weight percent of the hard composite. The support is made of a material that is bondable with the infiltrant alloy whereby the infiltrant alloy forms a joint at the interface of the support and the hard composite member.

In still another form thereof, the invention is a tough wear-resistant hard member that comprises a hard composite member and a support having a surface area adjacent to the hard composite member. The hard composite member is affixed to the support over at least a portion of the adjacent surface area of the support. The hard composite member comprises cemented carbide compacts wherein the cemented carbide compacts cover between about 40 percent and about 85 percent of the surface area of the hard composite. The hard composite further comprises a matrix powder comprising hard particles. The hard composite member further comprises an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member. The support is made of a material that is bondable with the infiltrant alloy whereby the infiltrant alloy forms a joint at the interface of the support and the hard composite member.

In still another form thereof, the invention is a tough wear-resistant hard member that comprises a hard composite member and a support having a surface area adjacent to the hard composite member. The hard composite member is affixed to the support over at least a portion of the adjacent surface area of the support. The hard composite member comprises a plurality of discrete hard constituents distributed in the hard composite member. The hard constituents comprise one or more of crushed nickel cemented chromium carbide particles having a particle size of −325+80 mesh and titanium diboride particles having a particle size of −325 mesh. The hard composite member further comprises a matrix powder comprising between about 65 weight percent and about 69 weight percent crushed tungsten carbide particles of a particle size of −80+325 mesh, between about 12 weight percent and about 17 weight percent crushed tungsten carbide particles having a particle size of −325 mesh, between about 12 weight percent and about 17 weight percent crushed cast tungsten carbide particles having a particle size of −325 mesh, and between about 1.5 weight percent and about 2.5 weight percent nickel particles having a particle size of −325 mesh. The hard composite member further comprises an infiltrant alloy having a melting point between about 500 degrees Centigrade and about 1400 degrees Centigrade. The infiltrant alloy is infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member. The support is made of a material that is bondable with the infiltrant alloy whereby the infiltrant alloy forms a joint at the joinder of the support and the hard composite member.

In yet another form thereof, the invention is a tough wear-resistant hard member comprising a hard composite member and a support having a surface area adjacent to the hard composite member. The hard composite member is affixed to the support over at least a portion of the adjacent surface area of the support. The hard composite member comprises crushed nickel cemented chromium carbide particles having a particle size of −325+80 mesh and titanium diboride particles having a particle size of −325 mesh. The crushed nickel cemented chromium carbide particles comprises between about 45 weight percent and about 70 weight percent of the combination of the crushed nickel cemented chromium carbide particles and the titanium diboride particles. The titanium diboride particles comprise between about 30 weight percent and about 55 weight percent of the combination of the crushed nickel cemented chromium carbide particles and the titanium diboride particles. The hard composite member further comprises an infiltrant alloy having a melting point between about 500 degrees Centigrade and about 1400 degrees Centigrade wherein the infiltrant alloy is infiltrated under heat into a mixture of the particles so as to not effectively degrade the particles upon infiltration, whereby the particles the infiltrant alloy are bonded together to form the hard composite member. The support is made of a material that is bondable with the infiltrant alloy whereby the infiltrant alloy forms a joint at the joinder of the support and the hard composite member.

BRIEF DESCRIPTION OF THE DRAWINGS

The following is a brief description of the drawings that form a pert of this patent application wherein.

DETAILED DESCRIPTION OF THE INVENTION

Figure 1:
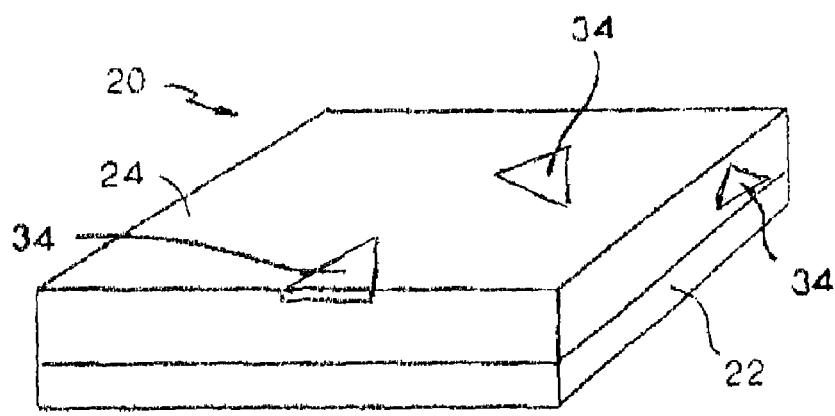
FIG. 1 is an isometric view of a tough wear-resistant member in the form of a plate wherein the tough wear-resistant member comprises a hard composite that provides wear resistance and contains hard constituents held in an infiltrant matrix and a support (e.g., steel) that provide toughness.

Referring to the drawings, one specific embodiment of the tough wear-resistant hard member generally designated as 20 is shown in FIG. 1. Tough wear-resistant member 20 is in the form of a plate; however, one must appreciate that the tough wear-resistant member can take on any one of a number of different shapes or geometries to accommodate different applications. In this regard, some of the later embodiments illustrated herein present different geometries.

The tough wear-resistant hard member 20 comprises a support 22 and a hard composite 24. The hard composite 24 is affixed to the support 22. The hard composite 24 provides the wear resistant properties and the support 22 provides the toughness properties.

Figure 2:
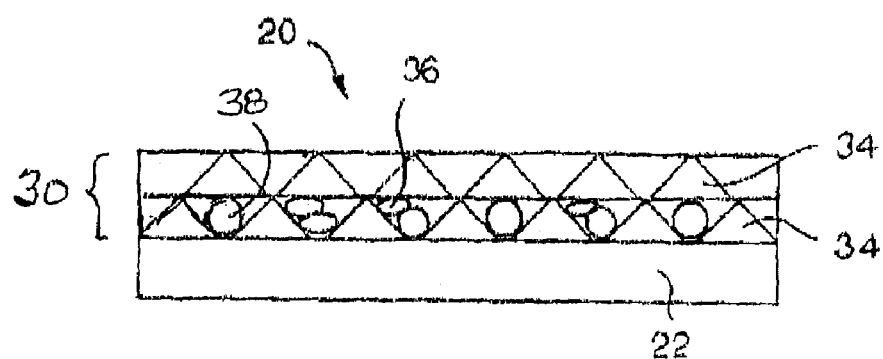
FIG. 2 is a schematic view of a hard member that comprises a hard composite and a support wherein the matrix holds the hard constituents to form the hard composite and there is a bond between the hard composite and the support.
Figure 3:
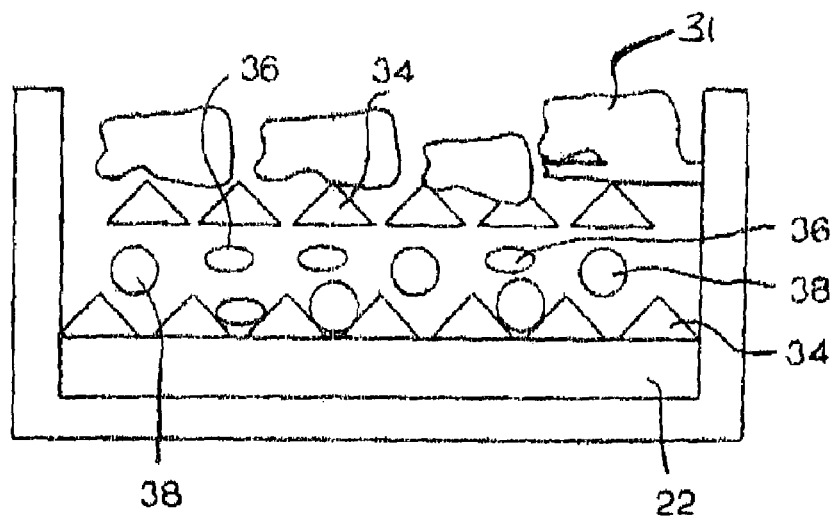
FIG. 3 is a schematic view of the components of the hard member of FIG. 2 in a mold prior to the infiltration of the matrix material through the mass of hard constituents wherein the infiltrant matrix material is on top of the mass of hard constituents, and the mass of hard constituents is positioned on a support.

FIG. 2 illustrates the tough wear-resistant member 20 of FIG. 1 in schematic fashion so as to show a cross section of the hard member 20. FIG. 3 is a schematic view that shows the general relative positioning of the components in the mold prior to the formation of the tough wear resistant member 20 of the embodiment of FIG. 1.

The support 22 may be made from any one of many materials that possess properties so as to provide toughness properties (as well as support) for the tough wear-resistant member 20. These materials include (without limitation) ferrous alloys and non-ferrous alloys, as well as other supports that may require a wear-resistant surface. Specific exemplary materials for the support comprise various steels such as, for example, AISI 4140 steel and AISI 316 stainless steel. The nominal composition (in weight percent) for the AISI 4140 steel is: 0.38–0.43% carbon, 0.75–1.00% manganese, 0.035% phosphorous, 0.040% sulfur, 0.15–0.35% silicon, 0.80–1.10% chromium, 0.15–0.25% molybdenum and the balance iron. The nominal composition (in weight percent) for 316 stainless steel is: maximum carbon 0.08%, maximum manganese 2.00%, maximum phosphorous 0.030%, maximum silicon 0.030%, 10.00–16.00% nickel, 16.00–18.00% chromium, 2.00–3.00% molybdenum, and the balance iron. The support could also comprise a casting having hard particles therein. The support could also comprise white cast iron. Although this aspect will be further discussed hereinafter, the support should also possess properties so that it is bondable with the infiltrant alloy whereby there is a secure bond between the support 22 and the hard composite 24.

In the specific embodiments of FIGS. 1 through 3, the hard composite 24 comprises a plurality of discrete hard constituents (described hereinafter) wherein these hard constituents are held within a matrix designated by bracket 30. The matrix comprises a mass of matrix powder that comprises different kinds of hard particles and/or powders, and an infiltrant alloy 31 (FIG. 3) that has been infiltrated into the mass of the matrix powder and the hard constituents under the influence of heat and sometimes under additional environmental influences such as, for example, in a pressure or in a vacuum. Furthermore, the infiltrant alloy may be infiltrated into the mass of hard constituents and matrix powder under various atmospheres (e.g., argon, helium, hydrogen, and nitrogen).

In the specific embodiment of FIGS. 1 through 3, the hard constituents comprise sintered cemented carbide compacts 34 that are shown in schematic in FIGS. 2 and 3 as a triangle-shaped member. In regard to the sintered cemented carbide compact 34, this hard constituent presents a specific pre-determined shape. This shape can vary depending upon the specific application for the tough wear-resistant hard member. Powder metallurgical techniques allow for the shape of the compact 34 to take on any one of a number of shapes or geometries. In one alternative, applicant contemplates that the hard constituents (e.g., hard compact 34) are of a size so as to have a surface area that ranges between about 0.001 square inches (0.006 square centimeters) and about 16 square inches (103 square centimeters). Applicant also contemplates that the compact may be of a size that ranges between about 0.005 square inches (0.03 square centimeters) and about 5 square inches (33 centimeters). Applicant further contemplates that the compact may be of a size that ranges between about 0.0005 square inches (0.003 square centimeters) and about 0.5 square inches (0.003 centimeters).

As an alternative, the hard compact 34 could be crushed to obtain hard constituents. In another alternative, applicant contemplates that the hard constituents are crushed particles (or the like) of a larger size wherein the particle size is measured by mesh size (e.g., –80+120 mesh).

The specific embodiment of FIGS. 1 through 3 shows that each one of the sintered cemented carbide compacts 34 is selectively positioned within the matrix of the hard composite 24. As FIG. 3 shows schematically, one generally accomplishes such orientation by selectively positioning the sintered cemented carbide compacts 34 in the mold prior to infiltration. Applicant contemplates that the compacts 34 may cover between about 0.5 percent to about 90 percent of the surface area of the wear-resistant hard member.

In the specific embodiment of FIGS. 1 through 3 (and as shown in schematic by FIGS. 2 and 3), the location of the sintered cemented carbide compacts 34 is in a region near the surface of the hard composite 24. As shown in schematic in FIGS. 2 and 3, sintered cemented carbide compacts 34 are also located in a region near the interface between the hard composite 24 and the support 22 whereby these compacts are on the surface of the support 22. Some of the sintered cemented carbide compacts 34 are also located above the sintered cemented carbide compacts 34 on the support 22. In this particular embodiment, the sintered cemented carbide compacts 34 are flush with the surface of the hard composite 24 so that they do not project therefrom. Applicant does not intend to restrict the invention to the specific positioning of the hard constituents in the hard composite. For example, the hard constituents may be uniformly (or non-uniformly or randomly) distributed throughout the volume of the hard composite.

One composition of the sintered cemented carbide compact 34 is cobalt cemented tungsten carbide wherein the cobalt ranges between about 0.2 weight percent and about 6 weight percent of the cobalt cemented tungsten carbide compact and tungsten carbide is the balance of the composition. Another composition for the sintered cemented carbide compact 34 is cobalt cemented tungsten carbide wherein the cobalt ranges between about 6 weight percent and about 30 weight percent of the cobalt cemented tungsten carbide compact and tungsten carbide is the balance of the composition. In still another composition, the sintered cemented carbide compact may comprise cobalt (10 weight percent cobalt) cemented tungsten carbide.

By mentioning the above specific hard constituent, applicant does not intend the limit the scope of the invention to this specific hard constituent. Applicant contemplates that other materials would be suitable for use as the hard constituents in the hard composite. In this regard, the following materials would appear to be suitable for use as hard constituents in the hard composite: sintered cemented tungsten carbide wherein a binder includes one or more of cobalt, nickel, iron and molybdenum; coated sintered cemented tungsten carbide wherein a binder includes one or more of cobalt, nickel, iron and molybdenum, and the coating comprises one or more of nickel, cobalt, iron and molybdenum; one or more of the carbides, nitrides, and borides of one or more of titanium, niobium, tantalum, hafnium, and zirconium; one or more of the coated carbides, coated nitrides, and coated borides of one or more of titanium, niobium, tantalum, hafnium, and zirconium wherein the coating comprises one or more of nickel, cobalt, iron and molybdenum; chromium carbides; coated chromium carbides; coated silicon carbide wherein the coating comprises one or more of nickel, cobalt, iron and molybdenum; and coated silicon nitride wherein the coating comprises one or more of nickel, cobalt, iron, copper, molybdenum or any other suitable metal; and coated boron carbide wherein the coating comprises one or more of nickel, cobalt, iron, copper, molybdenum, and any other suitable metal.

The matrix powder comprises a crushed cemented carbide particle 36 that is shown in schematic in FIGS. 2 and 3 as an oval-shaped member, and a crushed cast carbide particle 38 that is shown in schematic in FIGS. 2 and 3 as a circular-shaped member.

Referring to the components of the matrix powder, the crushed cemented carbide particles 36 may be present in a size range for these crushed cemented carbide particles equal to –325+200 mesh. Another size range for these crushed cemented carbide particles is –80+325 mesh. The standard to determine the particle size is by using sieve size analysis and the Fisher sub-sieve size analyzer for –325 mesh particles. One composition for the crushed cemented carbide particles is cobalt cemented tungsten carbide wherein the cobalt ranges between about 6 weight percent and about 30 weight percent of the cobalt cemented tungsten carbide material and tungsten carbide is the balance of the material. Another preferred composition for crushed cemented carbide particles is cobalt cemented tungsten carbide wherein the cobalt ranges between about 0.2 weight percent and about 6 weight percent of the cobalt cemented tungsten carbide material and tungsten carbide is the balance of the material.

By mentioning specific compositions, applicant does not intend the limit the scope of the invention to these specific cemented carbides. Applicant contemplates that other cemented carbides (e.g., chromium carbide) would be suitable for use as the crushed cemented tungsten carbide particles in the hard composite. In this regard, the carbides could be different from tungsten carbide (e.g., titanium carbide and chromium carbide) and the binder could be different from cobalt (e.g., nickel). Applicant further contemplates that the crushed cemented carbide particles may vary in composition throughout a particular hard composite depending upon the specific application. Applicant also contemplates that certain hard materials other than cemented carbides may be suitable to form these particles.

In regard to the crushed cast carbide particles 38, one size range for these particles is −325 mesh. Another size range for these particles is −80 mesh. One composition for these particles is cast tungsten carbide. Applicant contemplates that the crushed cast carbide particles may vary in composition throughout a particular hard composite depending upon the specific application. Applicant further contemplates that other cast carbides or hard materials are suitable for use in place or along with the crushed cast carbide particles 38.

The matrix powder may further include in addition to crushed cemented carbide particles and/or crushed cast carbide particles, any one or more of the following: crushed carbide particles (e.g., crushed tungsten carbide particles that have a size of −80+325 mesh), steel particles that have an exemplary size of −325 mesh, carbonyl iron particles that have an exemplary size of −325 mesh, cemented carbide powder, and coated (e.g., nickel coating) cemented carbide particles, and nickel-coated tungsten carbide particles (−80+325 mesh).

As show in FIG. 3, the crushed cemented carbide particles and the cast carbide particles are generally positioned throughout the volume of the mold.

As discussed above, it is desirable that the infiltrant alloy 31 has a melting point that is low enough so as to not degrade the hard constituents upon contact therewith during the infiltration process. Along this line, the infiltrant alloy has a melting point that ranges between about 500 degrees Centigrade and about 1400 degrees Centigrade. Applicant contemplates that the infiltrant alloys may have a melting point that ranges between about 600 degrees Centigrade and about 800 degrees Centigrade. Applicant further contemplates that the infiltrant alloys may have a melting point that ranges between about 690 degrees Centigrade and about 770 degrees Centigrade. Applicant still further contemplates that the infiltrant alloys may have a melting point below about 700 degrees Centigrade. Exemplary general types of infiltrant alloys include copper-based alloys such as, for example, copper-silver alloys, copper-zinc alloys, copper-nickel alloys, copper-tin alloys, and nickel-based alloys including nickel-copper-manganese alloys. Exemplary infiltrant alloys are set forth in Table 1 herein below.

TABLE 1

Compositions of Infiltrant Alloys in Weight Percent

| Alloy/Composition | Cu | Ni | Zn | Mn | Ag | Sn | Solidus (Melting Point)(° C.) | Liquidus (Flow Point) ° C. |
|---|---|---|---|---|---|---|---|---|
| A-1 | 53 | 15 | 8 | 24 | — | — | 1150 | |
| 202 | 45 | — | 35 | — | 20 | — | 710 | 815 |
| 255 | 40 | — | 33 | — | 25 | 2 | 690 | 780 |
| 559 | 42 | 2 | — | — | 56 | — | 770 | 895 |
| 700 | 20 | — | 10 | — | 70 | — | 690 | 740 |

By mentioning specific infiltrant alloys in Table 1, applicant does not intend to limit the scope of the invention to infiltrant alloys with these specific compositions and/or properties.

Referring to a tough wear-resistant member that presents an overall generally rectangular shape along the lines of FIG. 1, the hard particles in the hard composite may comprise 100 percent crushed nickel cemented chromium carbide particles. The nickel could comprise between about 3 weight percent and about 25 weight percent of the cemented carbide with chromium carbide comprising the balance. The preferred composition of the cemented carbide is about 15 weight percent nickel and the balance chromium carbide. The particle size of the crushed cemented (nickel) chromium carbide particles can range between about −325 mesh and about +80 mesh. The infiltrant alloy can comprise between about 60 weight percent and about 80 weight percent of the hard composite and the crushed nickel cemented chromium carbides can comprise between about 20 weight percent and about 40 weight percent of the hard composite.

The embodiment of FIG. 1 can also be made from the compositions set forth in Table 1A below. The matrix powder is Mixture No. 2 taken from Table 2 hereof. The hard constituents are crushed nickel cemented chromium carbide wherein the nickel is present in an amount of 15 weight percent. The particle size of the crushed cemented (nickel) chromium carbide particles can range between about −325 mesh and about +80 mesh. The titanium diboride (TiB$_2$) particles have a particle size equal to −325 mesh. The infiltrant alloy was the copper-based alloy A-1 set forth in Table 1. The infiltrant alloy comprised between about 60 weight percent and about 70 weight percent of the hard composite.

TABLE 2A

Compositions of the Hard Composite

| Composition | Matrix Powder Mixture No. 2 from Table 2 hereof (weight percent) | Crushed Nickel Cemented Chromium Carbide (−325 + 80 mesh) (weight percent) | Titanium Diboride Particles (−325 mesh) (weight percent) |
|---|---|---|---|
| 1-A | 40 | 40 | 20 |
| 2-A | 80 | | 20 |
| 3-A | 66 | | 34 |
| 4-A | | 66 | 34 |
| 5-A | | 50 | 50 |

Figure 4:
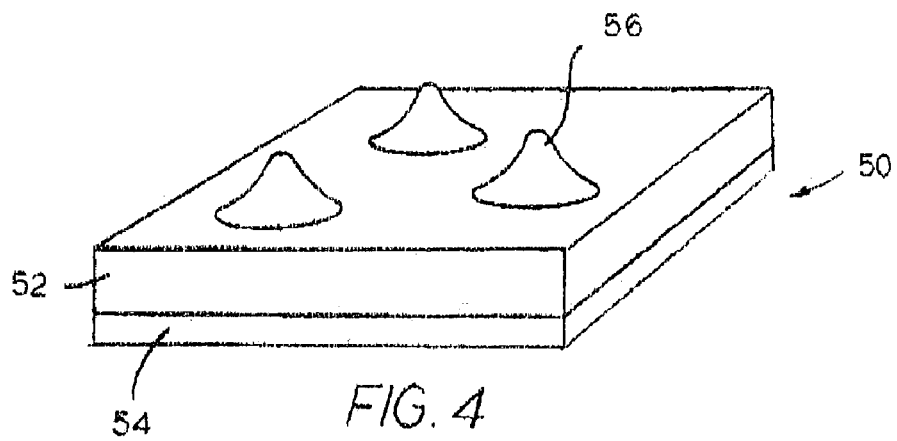
FIG. 4 is an isometric view of a specific embodiment of a hard member that comprises a hard composite and a support wherein a plurality of sintered cemented carbide compacts that comprise a part of the hard composite have at least a portion thereof that projects from the surface of the hard composite.

Referring to FIG. 4 there is shown a tough wear-resistant member that has a hard composite 52 affixed to a support 54. The hard composite 52 contains a plurality of sintered cemented carbide compacts 56 that project from one surface thereof. In this embodiment, the support typically is made from 4140 steel. The hard composite body 52 typically comprises sintered cemented carbide compacts 56 that typically have a composition of 10 weight percent cobalt and the balance tungsten carbide. The matrix powder typically includes tungsten carbide, chromium carbide, as well as cobalt and nickel in the form of a binder alloy for the carbides and/or a coating on the carbides. One typical infiltrant alloy has a composition (weight percent) of copper (53%)-nickel(15%)-manganese(24%)-zinc (8%) and a melting point equal to about 1150 degrees Centigrade.

The cemented carbide compacts 56 typically cover between about 40 percent to about 60 percent of the surface area of the hard composite 52. The cemented carbide compacts 56 generally comprise about 90 weight percent of the hard composite 52. In the specific embodiment illustrated the cemented carbide compacts 56 protrude from the surface and take on a drop-like shape. In the case where the cemented carbide compacts take on a square or rectangular shape, the compacts can cover up to between about 80 percent and about 85 percent of the surface area of the hard composite.

Figure 5:
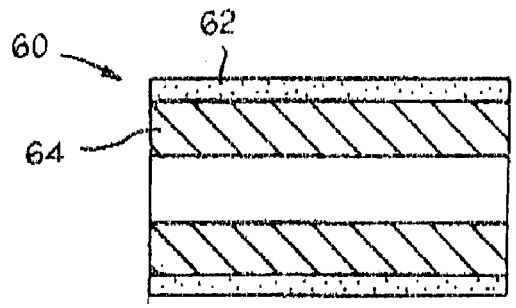
FIG. 5 is a cross-sectional view of a wear resistant tube wherein the interior layer of the pipe comprises a support and the exterior layer of the pipe comprises a hard composite so that the exterior surface possesses wear-resistant properties.

Referring to FIG. 5 there is shown a tough wear-resistant member 60 that has a cylindrical hard composite 62 affixed to a cylindrical support 64. In this embodiment, the support 64 typically is made from either 316 stainless steel or 4140 steel. The hard composite body 62 typically comprises hard constituents that comprise one or more sintered carbides wherein these carbides include tungsten, titanium, niobium, tantalum, hafnium, chromium and zirconium. The matrix powder typically comprises one or more sintered carbides, crushed sintered carbides, cast carbide, crushed carbides, tungsten carbide powders and chromium carbide powders. The infiltrant alloy has a composition (weight percent) of copper(53%)-nickel(15%)-manganese(24%)-zinc(8%) and a melting point equal to about 1150 degrees Centigrade.

In one specific example of member 60, the hard composite 62 contains hard constituents that comprise crushed cemented tungsten carbide having a particle size equal to −80+120 mesh. The cemented carbide is cobalt cemented tungsten carbide where the cobalt is present in an amount of 10 weight percent. The hard composite further contains a matrix powder that could be any one of the matrix powders set forth in Table 2 through Table 6 hereof, but preferred a matrix powder may be any one of Matrix Powders Nos. 1 through 3 set forth in Table 2 hereof. The ratio by weight of the matrix powder to the infiltrant alloy is about 40:60 by weight. In some applications, the hard constituent crushed cemented tungsten carbide particles (−80+120 mesh) range between about 2.5 volume percent and about 40 volume percent of the hard composite with the balance comprising matrix powder and infiltrant alloy. However, there are some applications in which the crushed cemented tungsten carbide particles range between about 2 volume percent to about 4 volume percent of the hard composite. There are also other applications in which the crushed cemented tungsten carbide particles range between about 30 volume percent and about 40 volume percent of the hard composite.

Figure 6:
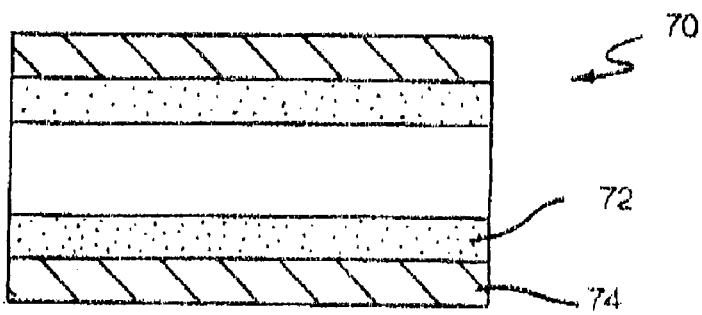
FIG. 6 is a cross-sectional view of a wear-resistant tube wherein the exterior layer of the tube comprises a support and the interior layer of the tube comprises a hard composite so that the interior layer possesses wear-resistant properties.

Referring to FIG. 6 there is shown a tough wear-resistant member 70 that has a cylindrical hard composite 72 affixed to a cylindrical support 74. In this embodiment, the support typically is made from 4140 steel or 316 stainless steel. The hard composite body 72 typically comprises hard constituents that comprise one or more sintered carbides wherein these carbides include tungsten, titanium, niobium, tantalum, hafnium, chromium and zirconium. The matrix powder typically comprises one or more sintered carbides, crushed sintered carbides, cast carbide, crushed carbides, tungsten carbide powders and chromium carbide powders. The infiltrant alloy has a composition of copper(53%)-nickel(15%)-manganese(24%)-zinc(8%) and a melting point equal to about 1150 degrees Centigrade.

Like for the embodiment of FIG. 5, the hard composite 72 contains hard constituents that comprise crushed cemented tungsten carbide having a particle size equal to −80+120 mesh. The cemented carbide is cobalt cemented tungsten carbide where the cobalt is present in an amount of 10 weight percent. The hard composite further contains a matrix powder that could be any one of the matrix powders set forth in Table 2 through Table 6 hereof, but preferred a matrix powder may be any one of Matrix Powders Nos. 1 through 3 set forth in Table 2 hereof. The ratio by weight of the matrix powder to the infiltrant alloy is about 40:60 by weight. In some applications, the hard constituent crushed cemented tungsten carbide particles (−80+120 mesh) range between about 2.5 volume percent and about 40 volume percent of the hard composite with the balance comprising matrix powder and infiltrant alloy. However, there are some applications in which the crushed cemented tungsten carbide particles range between about 2 volume percent to about 4 volume percent of the hard composite. There are also other applications in which the crushed cemented tungsten carbide particles range between about 30 volume percent and about 40 volume percent of the hard composite.

Figure 7:
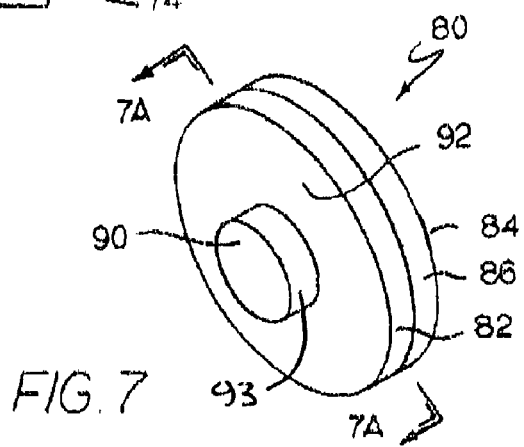
FIG. 7 is an isometric view of a center feed disk for an impeller rock crusher wherein the disk that presents an inner portion that presents a hard composite with a circular wear surface and a cylindrical wear surface and an outer portion that presents a circular or doughnut-like wear surface wherein the support member presents a non-planar interface (or surface) for joinder with the hard composite.
Figure 7A:
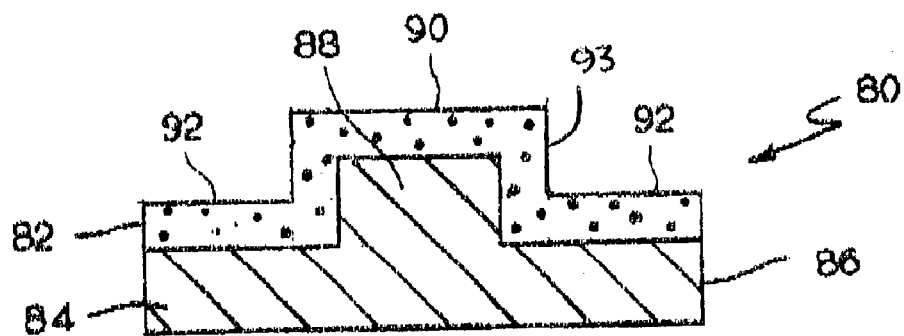
FIG. 7A is a cross-sectional view of the center feed disk of FIG. 7 illustrating the non-planer interface between the hard composite and the support.

Referring to FIGS. 7 and 7A, there is shown a tough wear-resistant member generally designated as 80 that has a hard composite 82 affixed to a support 84. Member 80 is a center feed disk for an impeller rock crusher. In this embodiment, the support 84 typically is made steel (e.g., 4140 steel) or white iron. The support 84 has a cylindrical base 86 with an inner cylindrical projection 88. As can be seen from the cross-sectional view of FIG. 7A, there is a non-planer interface between the support 84 and the hard composite 82. As also can be seen from FIGS. 7 and 7A, the hard composite 82 presents different wear surfaces 90 and 92 and cylindrical wear surface 93 wherein wear surface 90 is an inner circular surface and wear surface 92 is an outer circular or doughnut-like surface.

The hard composite body 82 typically comprises hard constituents that typically comprise cemented carbides, silicon carbides, boron carbide, aluminum oxide, zirconia and other suitable hard materials. The matrix powder typically comprises one or more of crushed tungsten carbide, crushed cemented tungsten carbide, crushed cast tungsten carbide, iron powder, tungsten carbide powder (the tungsten carbide made by a thermit process or from co-carburized tungsten carbide) and/or chromium carbide powder. The infiltrant alloy has a composition of copper(53%)-nickel(15%)-manganese(24%)-zinc(8%) and a melting point equal to about 1150 degrees Centigrade.

Figure 8:
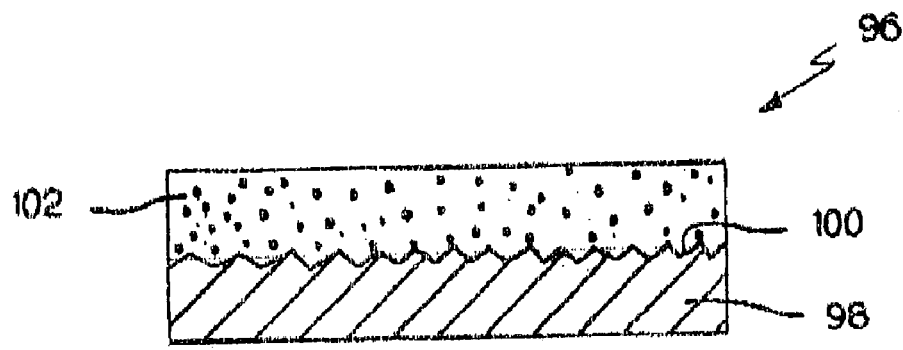
FIG. 8 is a cross-sectional view of a tough wear resistant member wherein the interface between the hard composite and the support presents a roughened surface.

Referring to FIG. 8, there is shown a tough wear-resistant member generally designated as 96. Member 96 has a support 98 that presents a roughened surface 100. Wear-resistant member 96 further includes a hard composite 102. The interface between the hard composite 102 and the support 98 is roughened as shown by FIG. 8.

Figure 9:
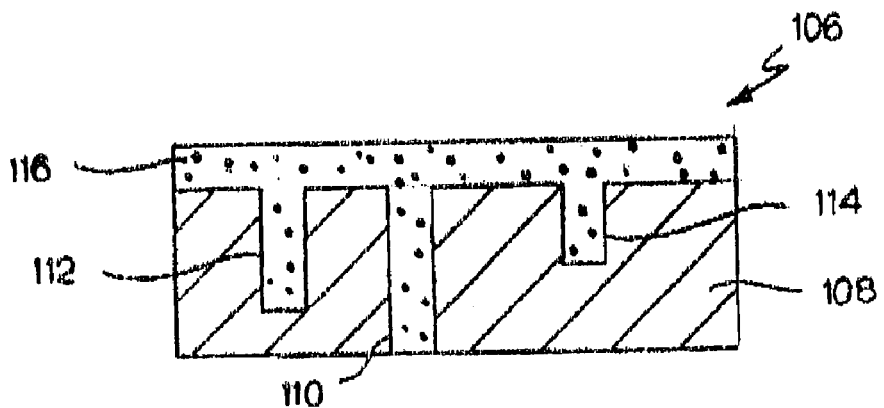
FIG. 9 is a cross-sectional view of a tough wear resistant member wherein the support contains holes therein with a portion of the hard composite contained within the holes.

Referring to FIG. 9, there is shown still another embodiment of a tough wear-resistant member generally designated as 106. Wear-resistant member 106 comprises a support 108 that contains a hole or bore 110 that passes all the way through the thickness of the support 108. Support 108 further contains a closed-end bore 112 of one depth and another closed-end bore of another depth 114. Bore 112 has a greater depth then does bore 114.

Wear-resistant member 106 also includes a hard composite 116. Hard composite 106 extends into the volumes of the bores (110, 112, 114) as is shown in the cross-sectional view of FIG. 9. The interface between the hard composite and the support is generally planar, except for the presence of the openings to the bores.

Figure 10:
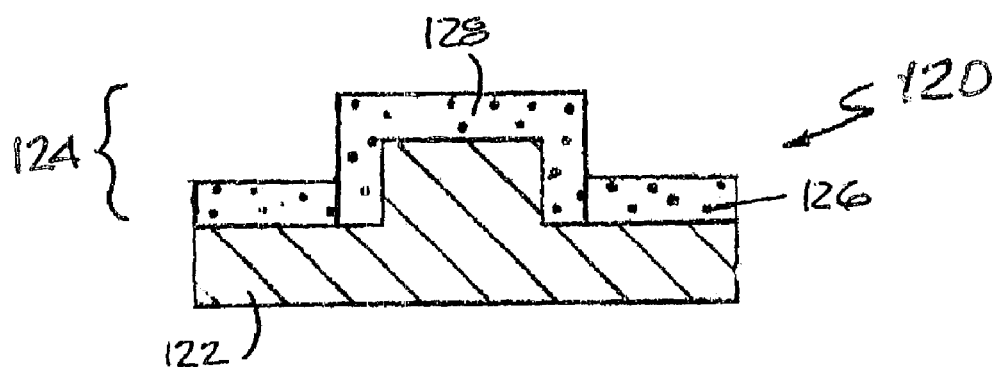
FIG. 10 is across-sectional view of another embodiment of a center feed disk wherein the hard composite comprises an outer ring of hard carbide particles cast in a matrix and an inner portion that comprises cemented carbide compacts held in a matrix powder and infiltrant alloy, and the hard composite is on a support.

FIG. 10 illustrates another specific embodiment of a center feed disk generally designated as 120. Disk 120 includes a support 122. The support 122 can be made from a number of different materials along the lines of the support 84. The disk 120 further includes a hard composite designated by brackets 124. The hard composite 124 comprises an outer ring 126. Outer ring 126 comprises hard particles cast in a Kencast matrix. The hard composite 124 also includes a center portion 128 that comprises about 90 volume percent cobalt cemented tungsten carbide compacts. The cobalt typically comprises about 10 weight percent of the cemented tungsten carbide compacts. The infiltrant alloy is the same as the infiltrant alloy used in the embodiment of FIGS. 7 and 7A.

Examples of specific matrix powders (Mixtures Nos. 1 through 20) are set forth in Tables 2 through 6 hereinafter.

TABLE 2

Components of the Matrix Powder Mixtures Nos. 1 through 4 (Weight Percent)

| Constituent (particle size) | Mixture No. 1 | Mixture No. 2 | Mixture No. 3 | Mixture No. 4 |
|---|---|---|---|---|
| Crushed tungsten carbide (−80 + 325 mesh) | 67 wt. % | 67 wt. % | 0 wt. % | 0 wt. % |
| Crushed tungsten carbide (−325 mesh) | 0 wt. % | 15.5 wt. % | 0 wt. % | 0 wt. % |
| Crushed cast tungsten carbide (−325 mesh) | 31 wt. % | 15.5 wt. % | 0 wt. % | 0 wt. % |
| 4600 steel (−325 mesh) | 1 wt. % | 0 wt. % | 0 wt. % | 0 wt. % |
| Carbonyl iron (−325 mesh) | 1 wt. % | 0 wt. % | 0 wt. % | 0 wt. % |
| Nickel (−325 mesh) | 0 wt. % | 2 wt. % | 0 wt. % | 0 wt. % |
| Crushed cobalt (10 wt. Percent) cemented tungsten carbide (−140 + 325 mesh) | 0 wt. % | 0 wt. % | 100 wt. % | |
| Crushed nickel (10 wt. Percent) cemented tungsten carbide (−140 + 325 mesh) | 0 wt. % | 0 wt. % | | 100 wt. % |

TABLE 3

Components of the Matrix Powder Mixtures Nos. 5 through 8 (Weight Percent)

| Constituent (particle size) | Mixture No. 5 | Mixture No. 6 | Mixture No. 7 | Mixture No. 8 |
|---|---|---|---|---|
| Crushed tungsten carbide (−80 + 325 mesh) | 63.65 wt. % | 63.65 wt. % | 0 wt. % | 0 wt. % |
| Crushed tungsten carbide (−325 mesh) | 0 wt. % | 14.725 wt. % | 0 wt. % | 0 wt. % |
| Crushed cast tungsten carbide (−325 mesh) | 29.45 wt. % | 14.725 wt. % | 0 wt. % | 0 wt. % |
| 4600 steel (−325 mesh) | .95 wt. % | 0 wt. % | 0 wt. % | 0 wt. % |
| Carbonyl iron (−325 mesh) | .95 wt. % | 0 wt. % | 0 wt. % | 0 wt. % |
| Nickel (−325 mesh) | 0 wt. % | 1.9 wt. % | 0 wt. % | 0 wt. % |
| Crushed cobalt (10 wt. Percent) cemented tungsten carbide (−140 + 325 mesh) | 0 wt. % | 0 wt. % | 95 wt. % | |

TABLE 3-continued

Components of the Matrix Powder Mixtures Nos. 5 through 8 (Weight Percent)

| Constituent (particle size) | Mixture No. 5 | Mixture No. 6 | Mixture No. 7 | Mixture No. 8 |
|---|---|---|---|---|
| Crushed nickel (10 wt. Percent) cemented tungsten carbide (−140 + 325 mesh) | 0 wt. % | 0 wt. % | | 95 wt. % |
| Chromium carbide (−45 mesh) | 5 wt. % | 5 wt. % | 5 wt. % | 5 wt. % |

TABLE 4

Components of the Matrix Powder Mixtures Nos. 9 through 12 (Weight Percent)

| Constituent (particle size) | Mixture No. 9 | Mixture No. 10 | Mixture No. 11 | Mixture No. 12 |
|---|---|---|---|---|
| Crushed tungsten carbide (−80 + 325 mesh) | 53.6 wt. % | 53.6 wt. % | 0 wt. % | 0 wt. % |
| Crushed tungsten carbide (−325 mesh) | 0 wt. % | 12.4 wt. % | 0 wt. % | 0 wt. % |
| Crushed cast tungsten carbide −325 mesh) | 24.8 wt. % | 12.4 wt. % | 0 wt. % | 0 wt. % |
| 4600 steel (−325 mesh) | .8 wt. % | 0 wt. % | 0 wt. % | 0 wt. % |
| Carbonyl iron (−325 mesh) | .8 wt. % | 0 wt. % | 0 wt. % | 0 wt. % |
| Nickel (−325 mesh) | 0 wt. % | 1.6 wt. % | 0 wt. % | 0 wt. % |
| Crushed cobalt (10 wt. Percent) cemented tungsten carbide (−140 + 325 mesh) | 0 wt. % | 0 wt. % | 80 wt. % | |
| Crushed nickel (10 wt. Percent) cemented tungsten carbide (−140 + 325 mesh) | 0 wt. % | 0 wt. % | 0 wt. % | 80 wt. % |
| Nickel Coated Tungsten Carbide Powder (−325 mesh) | 20 wt. % | 20 wt. % | 20 wt. % | 20 wt. % |

TABLE 5

Components of Matrix Powder Mixtures 13 through 16 (Weight Percent)

| Constituent (particle size) | Mixture No. 13 | Mixture No. 14 | Mixture No. 15 | Mixture No. 16 |
|---|---|---|---|---|
| Crushed tungsten carbide (−80 + 325 mesh) | 60.3 wt. % | 60.3 wt. % | 0 wt. % | 0 wt. % |
| Crushed tungsten carbide (−325 mesh) | 0 wt. % | 13.95 wt. % | 0 wt. % | 0 wt. % |
| Crushed cast tungsten carbide (−325 mesh) | 27.9 wt. % | 13.95 wt. % | 0 wt. % | 0 wt. % |
| 4600 steel (−325 mesh) | .9 wt. % | 0 wt. % | 0 wt. % | 0 wt. % |

TABLE 5-continued

Components of Matrix Powder Mixtures 13 through 16
(Weight Percent)

| Constituent (particle size) | Mixture No. 13 | Mixture No. 14 | Mixture No. 15 | Mixture No. 16 |
|---|---|---|---|---|
| Carbonyl iron (−325 mesh) | .9 wt. % | 0 wt. % | 0 wt. % | 0 wt. % |
| Nickel (−325 mesh) | 0 wt. % | 1.8 wt. % | 0 wt. % | 0 wt. % |
| Crushed cobalt (10 wt. Percent) cemented tungsten carbide (−140 + 325 mesh) | 0 wt. % | 0 wt. % | 90 wt. % | |
| Crushed nickel (10 wt. Percent) cemented tungsten carbide (−140 + 325 mesh) | 0 wt. % | 0 wt. % | 0 wt. % | 90 wt. % |
| Crushed nickel (15 wt %) cemented chromium carbide(Ni-$Cr_3C_2$) (−140 + 325 mesh) | 10 wt. % | 10 wt. % | 10 wt. % | 10 wt. % |

TABLE 6

Components of Matrix Powder Mixtures 17 through 20
(in Weight Percent)

| Constituent (particle size) | Mixture No. 17 | Mixture No. 18 | Mixture No. 19 | Mixture No. 20 |
|---|---|---|---|---|
| Crushed tungsten carbide (−80 + 325 mesh) | 56.95 wt. % | 56.95 wt. % | 0 wt. % | 0 wt. % |
| Crushed tungsten carbide (−325 mesh) | 0 wt. % | 13.175 wt. % | 0 wt. % | 0 wt. % |
| Crushed cast tungsten carbide −325 mesh) | 26.35 wt. % | 13.175 wt. % | 0 wt. % | 0 wt. % |
| 4600 steel (−325 mesh) | .85 wt. % | 0 wt. % | 0 wt. % | 0 wt. % |
| Carbonyl iron (−325 mesh) | .85 wt. % | 0 wt. % | 0 wt. % | 0 wt. % |
| Nickel (−325 mesh) | 0 wt. % | 1.7 wt. % | 0 wt. % | 0 wt. % |
| Crushed cobalt (10 wt. Percent) cemented tungsten carbide (−140 + 325 mesh) | 0 wt. % | 0 wt. % | 85 wt. % | |
| Crushed nickel (10 wt. Percent) cemented tungsten carbide (−140 + 325 mesh) | 0 wt. % | 0 wt. % | | 85 wt. % |
| Nickel-coated tungsten carbide (−325 mesh) | 15 wt. % | 15 wt. % | 15 wt. % | 15 wt. % |

In regard to some specific examples, a tough wear-resistant member was made wherein there was a support and a hard composite. The hard composite comprised hard constituents that comprised sintered cobalt (10 weight percent cobalt) cemented tungsten carbide compacts and the matrix powder comprised Mixture No. 1 in Table 1 and the infiltrant alloy comprised (in weight percent) a Cu(53%)-Ni(15%)-Zn(8%)-Mn(24%) alloy described above. The matrix powder comprised 40 weight percent and the infiltrant alloy comprised 60 weight percent of the combination of the matrix powder and the infiltrant alloy. Depending upon the specific application, the cemented tungsten carbide compacts were present in a specified amount between about 1 weight percent and about 95 weight percent with the balance of the hard composite comprising the matrix powder and the infiltrant alloy. In the alternative and depending upon the specific application, the cemented tungsten carbide compacts were present in a specified amount between about 1 weight percent and about 90 percent of the surface area of the hard composite. For some applications, the cemented tungsten carbide compacts may be present in a range between about 1 percent to about 5 percent of the surface area. For other applications, the cemented tungsten carbide compacts may be present in a range between about 70 percent and about 90 percent of the surface area.

Another tough wear-resistant member was made wherein there was a support and a hard composite. The hard composite comprised hard constituents. The hard constituent comprised a sintered cobalt (6 weight percent cobalt) cemented tungsten carbide compact. The matrix powder comprised Mixture No. 2. The infiltrant alloy comprised in weight percent) a Cu(53%)-Ni(15%)-Zn(8%)-Mn( 24%). The matrix powder comprised 45 weight percent and the infiltrant alloy comprised 55 weight percent of the combination of the matrix powder and the infiltrant alloy. Depending upon the specific application, the cemented tungsten carbide compacts were present in a specified amount between about 1 weight percent and about 95 weight percent with the balance of the hard composite comprising the matrix powder and the infiltrant alloy. In the alternative and depending upon the specific application, the cemented tungsten carbide compacts were present in a specified amount between about 1 weight percent and about 90 percent of the surface area of the hard composite. For some applications, the cemented tungsten carbide compacts may be present in a range between about 1 percent to about 5 percent of the surface area. For other applications, the cemented tungsten carbide compacts may be present in a range between about 70 percent and about 90 percent of the surface area.

Still another tough wear-resistant member was made wherein there was a support and a hard composite. The hard composite comprised hard constituents wherein the hard constituent comprised sintered cobalt (6 weight percent cobalt) cemented tungsten carbide cylindrical compacts. The matrix powder was Mixture No. 3 as set forth in Table 1. The infiltrant alloy comprised (in weight percent) a Cu(53%)-Ni (15%)-Zn(8%)-Mn(24%). The matrix powder comprised 40 weight percent and the infiltrant alloy comprised 60 weight percent of the combination of the matrix powder and the infiltrant alloy. Depending upon the specific application, the cemented tungsten carbide compacts were present in a specified amount between about 1 weight percent and about 95 weight percent with the balance of the hard composite comprising the matrix powder and the infiltrant alloy. In the alternative and depending upon the specific application, the cemented tungsten carbide compacts were present in a specified amount between about 1 weight percent and about 90 percent of the surface area of the hard composite. For some applications, the cemented tungsten carbide compacts may be present in a range between about 1 percent to about 5 percent of the surface area. For other applications, the cemented tungsten carbide compacts may be present in a range between about 70 percent and about 90 percent of the surface area.

Another tough wear-resistant member was made wherein there was a support and a hard composite. The hard composite comprised hard constituents comprised of nickel-coated sintered cobalt (10 weight percent cobalt) cemented tungsten carbide compacts. The matrix powder comprised Mixture No. 4 from Table 1. The infiltrant alloy comprised (in weight percent) a Cu(53%)-Ni(15%)-Zn( 8%)-Mn(24%). The matrix powder comprised 45 weight percent and the infiltrant alloy comprised 55 weight percent of the combination of the matrix powder and the infiltrant alloy. Depending upon the specific application, the cemented tungsten carbide compacts were present in a specified amount between about 1 weight percent and about 95 weight percent with the balance of the hard composite comprising the matrix powder and the infiltrant alloy. In the alternative and depending upon the specific application, the cemented tungsten carbide compacts were present in a specified amount between about 1 weight percent and about 90 percent of the surface area of the hard composite. For some applications, the cemented tungsten carbide compacts may be present in a range between about 1 percent to about 5 percent of the surface area. For other applications, the cemented tungsten carbide compacts may be present in a range between about 70 percent and about 90 percent of the surface area.

It should also be appreciated that the tough wear-resistant body of the present invention may be used in high temperature applications such as, for example, a fluid liner used in the chemical industry wherein such a liner may comprise a fluid catalytic cracking liner used in the oil refinery business. The operating temperature ranges between about room temperature and about 1600 degrees Fahrenheit.

All patents, patent applications, articles and other documents identified herein are hereby incorporated by reference herein. Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. A tough wear-resistant hard member comprising:

a hard composite member;

a support having a surface area adjacent to the hard composite member;

the hard composite member affixed to the support over at least a portion of the adjacent surface area of the support;

the hard composite member comprising a plurality of discrete hard constituents distributed in the hard composite member, each one of the discrete hard constituents is of a size so as to have a surface area between about 0.001 square inches and about 16 square inches;

the hard composite member further comprising a matrix powder comprising hard particles wherein substantially all of the hard particles have a size smaller than the size of the hard constituents;

the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member;

the support being made of a material that is bondable with the infiltrant alloy whereby the infiltrant alloy forms a joint at the joinder of the support and the hard composite member, and where the matrix powder comprises between about 50 weight percent to about 70 weight percent crushed tungsten carbide particles having a particle size of −80+325 mesh, between about 24 weight percent and about 32 weight percent crushed cast tungsten carbide particles having a particle size of −325 mesh, between about 0.8 weight percent and about 1.2 weight percent steel particles having a particle size of −325 mesh, between about 0.8 and 1.2 weight percent carbonyl iron particles having a particle size of −325 mesh, between 0 weight percent and about 7 weight percent chromium carbide particles having a particle size of −45 mesh, between 0 weight percent and about 25 weight percent nickel-coated tungsten carbide particles having a particle size of −325 mesh, and between 0 weight percent and about 15 weight percent crushed cemented chromium carbide-nickel particles having a particle size of −140+325 mesh.

2. The tough wear-resistant member of claim 1 wherein the matrix powder comprises between about 65 weight percent and about 69 weight percent crushed tungsten carbide particles having a particle size of −325 mesh, between about 29 weight percent and about 32 weight percent crushed cast tungsten carbide particles having a particle size of −325 mesh, between about 0.9 weight percent and about 1.1 steel particles having a particle size of −325 mesh, and between about 0.9 weight percent and about 1.1 weight percent carbonyl iron particles having a particle size of −325 mesh.

3. The tough wear-resistant member of claim 1 wherein the matrix powder comprises between about 61 weight percent and about 66 weight percent crushed tungsten carbide particles having a particle size of −325 mesh, between about 27 weight percent and about 31 weight percent crushed cast tungsten carbide particles having a particle size of −325 mesh, between about 0.8 weight percent and about 1.0 steel particles having a particle size of −325 mesh, between about 0.8 weight percent and about 1.0 weight percent carbonyl iron particles having a particle size of −325 mesh.

4. The tough wear-resistant member of claim 1 wherein the matrix powder comprises between about 51 weight percent and about 56 weight percent crushed tungsten carbide particles having a particle size of −325 mesh, between about 24 weight percent and about 32 weight percent crushed cast tungsten carbide particles having a particle size of −325 mesh, between about 0.8 weight percent and about 0.9 steel particles having a particle size of −325 mesh, between about 0.8 weight percent and about 0.9 weight percent carbonyl iron particles having a particle size of −325 mesh, and between about 15 weight percent and about 25 weight percent nickel-coated tungsten carbide particles having a particle size of −325 mesh.

5. The tough wear-resistant member of claim 1 wherein the matrix powder comprises between about 58 weight percent and about 63 weight percent crushed tungsten carbide particles having a particle size of −325 mesh, between about 25 weight percent and about 29 weight percent crushed cast tungsten carbide particles having a particle size of −325 mesh, between about 0.8 weight percent and about 1.0 steel particles having a particle size of −325 mesh, between about 0.8 weight percent and about 1.0 weight percent carbonyl iron particles having a particle size of −325 mesh, and between about 8 weight percent and about 12 weight percent crushed cemented chromium carbide-nickel particles of a particle size −140+325 mesh.

6. The tough wear-resistant member of claim 1 wherein the matrix powder comprises between about 65 weight percent and about 69 weight percent crushed tungsten carbide particles having a particle size of −325 mesh, between about 29 weight percent and about 33 weight percent crushed cast tungsten carbide particles having a particle size of −325 mesh, between about 0.9 weight percent and about 1.1 steel particles having a particle size of −325 mesh, and between about 0.9 weight percent and about 1.1 weight percent carbonyl iron particles having a particle size of −325 mesh and between about 4 weight percent and about 6 weight percent chromium carbide particles having a particle size of −45 mesh.

7. A tough wear-resistant hard member comprising:
a hard composite member;
a support having a surface area adjacent to the hard composite member;
the hard composite member affixed to the support over at least a portion of the adjacent surface area of the support;
the hard composite member comprising a plurality of discrete hard constituents distributed in the hard composite member, each one of the discrete hard constituents is of a size so as to have a surface area between about 0.001 square inches and about 16 square inches;
the hard composite member further comprising a matrix powder comprising hard particles wherein substantially all of the hard particles have a size smaller than the size of the hard constituents;
the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member;
the support being made of a material that is bondable with the infiltrant alloy whereby the infiltrant alloy forms a joint at the joinder of the support and the hard composite member, and
wherein the matrix powder comprises between about 65 weight percent and about 69 weight percent crushed tungsten carbide particles of a particle size of −80+325 mesh, between about 12 weight percent and about 17 weight percent crushed tungsten carbide particles having a particle size of −325 mesh, between about 12 weight percent and about 17 weight percent crushed cast tungsten carbide particles having a particle size of −325 mesh, and between about 1.5 weight percent and about 2.5 weight percent nickel particles having a particle size of −325 mesh.

8. The tough wear-resistant member of claim 7 wherein the matrix powder comprises between about 65 weight percent and about 66 weight percent crushed tungsten carbide particles of a particle size of −80+325 mesh, between about 12 weight percent and about 16 weight percent crushed tungsten carbide particles having a particle size of −325 mesh, between about 12 weight percent and about 16 weight percent crushed cast tungsten carbide particles having a particle size of −325 mesh, and between about 1.5 weight percent and about 2.5 weight percent nickel particles having a particle size of −325 mesh, and between about 4 weight percent and about 6 weight percent chromium carbide particles having a particle size of −45 mesh.

9. The tough wear-resistant member of claim 7 wherein the matrix powder comprises between about 65 weight percent and about 69 weight percent crushed tungsten carbide particles of a particle size of −80+325 mesh, between about 12 weight percent and about 17 weight percent crushed tungsten carbide particles having a particle size of −325 mesh, between about 12 weight percent and about 17 weight percent crushed cast tungsten carbide particles having a particle size of −325 mesh, and between about 1.5 weight percent and about 2.5 weight percent nickel particles having a particle size of −325 mesh, and between about 7 weight percent and about 13 weight percent crushed cemented chromium carbide-nickel particles having a particle size of −140+325 mesh.

10. A tough wear-resistant hard member comprising:
a hard composite member;
a support having a surface area adjacent to the hard composite member;
the hard composite member affixed to the support over at least a portion of the adjacent surface area of the support;
the hard composite member comprising a plurality of discrete hard constituents distributed in the hard composite member, each one of the discrete hard constituents is of a size so as to have a surface area between about 0.001 square inches and about 16 square inches;
the hard composite member further comprising a matrix powder comprising hard particles wherein substantially all of the hard particles have a size smaller than the size of the hard constituents;
the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member;
the support being made of a material that is bondable with the infiltrant alloy whereby the infiltrant alloy forms a joint at the joinder of the support and the hard composite member, and
wherein the matrix powder comprises between about 51 weight percent and about 56 weight percent crushed tungsten carbide particles of a particle size of −80+325 mesh, between about 10 weight percent and about 15 weight percent crushed tungsten carbide particles having a particle size of −325 mesh, between about 10 weight percent and about 15 weight percent crushed cast tungsten carbide particles having a particle size of −325 mesh, and between about 1.3 weight percent and about 1.9 weight percent nickel particles having a particle size of −325 mesh, and between about 15 weight percent and about 25 weight percent nickel-coated tungsten carbide particles having a particle size of −325 mesh.

11. A tough wear-resistant hard member comprising:
a hard composite member;
a support having a surface area adjacent to the hard composite member;
the hard composite member affixed to the support over at least a portion of the adjacent surface area of the support;
the hard composite member comprising a plurality of discrete hard constituents distributed in the hard composite member, each one of the discrete hard constituents is of a size so as to have a surface area between about 0.001 square inches and about 16 square inches;
the hard composite member further comprising a matrix powder comprising hard particles wherein substantially all of the hard particles have a size smaller than the size of the hard constituents;
the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member;
the support being made of a material that is bondable with the infiltrant alloy whereby the infiltrant alloy forms a joint at the joinder of the support and the hard composite member, and
wherein the matrix powder comprises between about 80 weight percent and about 100 weight percent crushed cobalt cemented tungsten carbide particles having a particle size of −140+325 mesh, and between 0 weight percent and about 10 weight percent chromium abide particles having a particle size of −45 mesh, between 0 weight percent and about 25 weight percent nickel-coated tungsten carbide particles having a particle size of −325 mesh, and between 0 weight percent and about 15 weight percent crushed cemented chromium carbide-nickel particles having a particle size of −140+325 mesh.

12. The tough wear-resistant member of claim 11 wherein the matrix powder comprises about 100 weight percent crushed cobalt cemented tungsten carbide particles having a particle size of −140+325 mesh.

13. The tough wear-resistant member of claim 11 wherein the matrix powder comprises about 95 weight percent crushed cobalt cemented tungsten carbide particles having a particle size of −140+325 mesh, and about 5 weight percent chromium carbide particles having a particle size of −45 mesh.

14. The tough wear-resistant member of claim 11 wherein the matrix powder comprises about 80 weight percent crushed cobalt cemented tungsten carbide particles having a particle size of −140+325 mesh, and about 20 weight percent nickel-coated tungsten carbide particles having a particle size of −325 mesh.

15. The tough wear-resistant member of claim 11 wherein the matrix powder comprises about 90 weight percent crushed cobalt cemented tungsten carbide particles having a particle size of −140+325 mesh, and about 10 weight percent crushed cemented chromium carbide-nickel particles having a particle size of −140+325 mesh.

16. A tough wear-resistant hard member comprising:
a hard composite member;
a support having a surface area adjacent to the hard composite member;

the hard composite member affixed to the support over at least a portion of the adjacent surface area of the support;

the hard composite member comprising a plurality of discrete hard constituents distributed in the hard composite member, each one of the discrete hard constituents is of a size so as to have a surface area between about 0.001 square inches and about 16 square inches;

the hard composite member further comprising a matrix powder comprising hard particles wherein substantially all of the hard particles have a size smaller than the size of the hard constituents;

the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member;

the support being made of a material that is bondable with the infiltrant alloy whereby the infiltrant alloy forms a joint at the joinder of the support and the hard composite member, and wherein the matrix powder comprises between about 80 weight percent and about 100 weight percent crushed nickel cemented tungsten carbide particles having a particle size of −325 mesh, and between 0 weight percent and about 10 weight percent chromium carbide particles having a particle size of −45 mesh, between 0 weight percent and about 25 weight percent nickel-coated tungsten carbide particles having a particle size of −325 mesh, and between 0 weight percent and about 15 weight percent crushed cemented chromium carbide-nickel particles having a particle size of −140+325 mesh.

17. The tough wear-resistant member of claim 16 wherein the matrix powder comprises about 100 weight percent crushed nickel cemented tungsten carbide particles having a particle size of −325 mesh.

18. The tough wear-resistant member of claim 16 wherein the matrix powder comprises about 95 weight percent crushed nickel cemented tungsten carbide particle having a particle size of −325 mesh, and about 5 weight percent chromium carbide particles having a particle size of −45 mesh.

19. The tough wear-resistant member of claim 16 wherein the matrix powder comprises about 80 weight percent and about 90 weight percent crushed nickel cemented tungsten carbide particles having a particle size of −325 mesh, and between about 10 weight percent and about 20 weight percent nickel-coated tungsten carbide particles having a particle size of −325 mesh.

20. The tough wear-resistant member of claim 16 wherein the matrix powder comprises about 90 weight percent crushed nickel cemented tungsten carbide particles having a particle Size of −325 mesh, and about 10 weight percent nickel-coated tungsten carbide particles having a particle size of −325 mesh.

21. The tough wear-resistant member of claim 16 wherein the matrix powder comprises about 85 weight percent crushed nickel cemented tungsten carbide particles having a particle size of −325 mesh, and about 15 weight percent nickel-coated tungsten carbide particles having a particle size of −325 mesh.

22. A tough wear-resistant hard member comprising:
a support having a surface area;
a hard composite member affixed to the support over at least a portion of the surface area of the support;
the hard composite member comprising a plurality of discrete hard constituents distributed in the hard composite member, each one of the discrete hard constituents is of a size so as to have a surface area between about 0.001 square inches and about 16 square inches;
the hard composite member further comprising a matrix powder comprising hard particles wherein substantially all of the hard particles of the matrix powder have a smaller size than the hard constituents;
the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member;
the support being made of a material that is bondable with the infiltrant alloy whereby the infiltrant alloy forms a joint at the joinder of the support and the hard composite member; and
wherein the hard discrete constituents comprise nickel-coated sintered cobalt cemented tungsten carbide compacts wherein the cobalt content is about 10 weight percent.

23. A tough wear-resistant hard member comprising:
a hard composite member;
a support having a surface area adjacent to the hard composite member;
the hard composite member affixed to the support over at least a portion of the adjacent surface area of the support;
the hard composite member comprising a plurality of discrete hard constituents distributed in the hard composite member, the hard constituents comprising one or more of crushed nickel cemented chromium carbide particles having a particle size of −325+80 mesh and titanium diboride particles having a particle size of −325 mesh;
the hard composite member further comprising a matrix powder comprising between about 65 weight percent and about 69 weight percent crushed tungsten carbide particles of a particle size of −80+325 mesh, between about 12 weight percent and about 17 weight percent crushed tungsten carbide particles having a particle size of −325 mesh, between about 12 weight percent and about 17 weight percent crushed cast tungsten carbide particles having a particle size of −325 mesh, and between about 1.5 weight percent and about 2.5 weight percent nickel particles having a particle size of −325 mesh;
the hard composite member further comprising an infiltrant alloy having a melting point between about 500 degrees Centigrade and about 1400 degrees Centigrade, and the infiltrant alloy being infiltrated under heat into a mixture of the discrete hard constituents and the matrix powder so as to not effectively degrade the hard constituents upon infiltration, whereby the hard constituents and the matrix powder and the infiltrant alloy are bonded together to form the hard composite member; and the support being made of a material that is bondable with the infiltrant alloy whereby the infiltrant alloy forms a joint at the joinder of the support and the hard composite member.

24. The tough wear-resistant hard member of claim 23 wherein the matrix powder comprises between about 35 weight percent and about 45 weight percent of the combination of the matrix powder and the hard constituents, the crushed nickel cemented chromium carbide particles comprise between about 35 weight percent and about 45 weight percent of the combination of the matrix powder and the hard constituents, the titanium diboride particles comprise between about 15 weight percent and about 25 weight percent of the combination of the matrix powder and the hard constituents.

25. The tough wear-resistant hard member of claim 23 wherein the hard constituents comprise titanium diboride, the matrix powder comprises between about 75 weight percent and about 85 weight percent of the combination of the matrix powder and the titanium diboride particles, and the titanium diboride particles comprise between about 15 weight percent and about 25 weight percent of the combination of the matrix powder and the titanium diboride particles.

26. The tough wear-resistant hard member of claim 23 wherein the hard constituents comprise titanium diboride, the matrix powder comprises between about 60 weight percent and about 75 weight percent of the combination of the matrix powder and the titanium diboride particles, and the titanium diboride particles comprise between about 25 weight percent and about 40 weight percent of the combination of the matrix powder and the titanium diboride particles.

27. The tough wear-resistant member of claim 23 wherein the infiltrant alloy comprises about 25 weight percent copper, about 15 weight percent nickel, about 8 weight percent zinc, and about 24 weight percent manganese.

28. The tough wear-resistant hard member of claim 23 wherein the infiltrant alloy comprises between about 60 weight percent and about 70 weight percent of the hard composite.

29. A tough wear-resistant hard member comprising:
a hard composite member;
a support having a surface area adjacent to the hard composite member;
the hard composite member affixed to the support over at least a portion of the adjacent surface area of the support;
the hard composite member comprising crushed nickel cemented chromium carbide particles having a particle size of −325+80 mesh and titanium diboride particles having a particle size of −325 mesh, and the crushed nickel cemented chromium carbide particles comprising between about 45 weight percent and about 70 weight percent of the combination of the crushed nickel cemented chromium carbide particles and the titanium diboride particles; the titanium diboride particles comprising between about 30 weight percent and about 55 weight percent of the combination of the crushed nickel cemented chromium carbide particles and the titanium diboride particles;
the hard composite member further comprising an infiltrant alloy having a melting point between about 500 degrees Centigrade and about 1400 degrees Centigrade, and the infiltrant alloy being infiltrated under heat into a mixture of the particles so as to not effectively degrade the particles upon infiltration, whereby the particles the infiltrant alloy are bonded together to form the hard composite member; and
the support being made of a material that is bondable with the infiltrant alloy whereby the infiltrant alloy forms a joint at the joinder of the support and the hard composite member.

30. The tough wear-resistant hard member of claim 29 wherein the crushed nickel cemented chromium carbide particles comprising between about 66 weight percent of the combination of the crushed nickel cemented chromium carbide particles and the titanium diboride particles, and the titanium diboride particles comprising about 34 weight percent of the combination of the crushed nickel cemented chromium carbide particles and the titanium diboride particles.

31. The tough wear-resistant hard member of claim 29 wherein the crushed nickel cemented chromium carbide particles comprising between about 50 weight percent of the combination of the crushed nickel cemented chromium carbide particles and the titanium diboride particles, and the titanium diboride particles comprising about 50 weight percent of the combination of the crushed nickel cemented chromium carbide particles and the titanium diboride particles.

* * * * *

UNITED STATES PATENT AND TRADEMARK OFFICE
CERTIFICATE OF CORRECTION

PATENT NO. : 6,984,454 B2  Page 1 of 1
APPLICATION NO. : 10/455492
DATED : January 10, 2006
INVENTOR(S) : Shivanand I. Majagi It is certified that error appears in the above-identified patent and that said Letters Patent is hereby corrected as shown below:

Col. 19, line 50, "comprises about" should read -- comprises between about --.
Col. 27, line 35, "about 25" should read -- about 53 --.
Col. 28, line 21, "particles the" should read -- particles and the --.

Signed and Sealed this

Twelfth Day of October, 2010

David J. Kappos
*Director of the United States Patent and Trademark Office*